Figure 1:
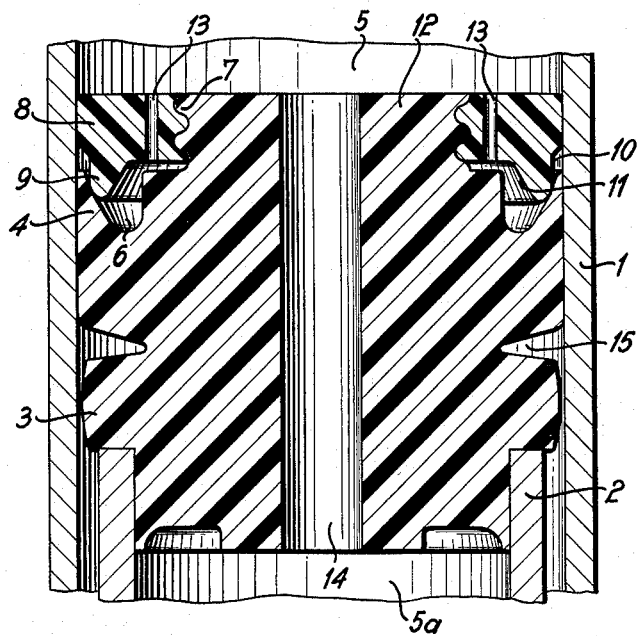

Jan. 26, 1965     E. BLENKLE     3,166,993

PISTON WITH SEALING MEANS

Filed April 12, 1962

INVENTOR
Erwin Blenkle by:
Michael J. Striker
Attorney

United States Patent Office 3,166,993
Patented Jan. 26, 1965

3,166,993
PISTON WITH SEALING MEANS
Erwin Blenkle, Bochum, Germany, assignor to Bochumer Eisenhutte Heintzmann & Co., Bochum, Germany, a firm
Filed Apr. 12, 1962, Ser. No. 187,128
Claims priority, application Germany, May 10, 1961,
B 62,443
23 Claims. (Cl. 92—181)

This invention relates to a piston for hydraulic and like cylinders, and more specifically to a ram piston for a hydraulic pit prop.

In cylinders containing a piston which is required slidably to seal a high pressure chamber—as for instance the ram piston in a hydraulic pit prop—the quality and functioning of the actual sealing element on the piston is naturally of primary importance to the efficient working of the piston and cylinder. A great variety of sealing elements for ram pistons in hydraulic pit props or for pistons or plungers in hydraulic or compressed air operated engines of other kinds has already been described in the literature. To the extent the sealing elements on the piston consist of flexible elastic materials, these elements are usually intended to make contact with the cooperating cylinder wall over a fairly large area. Contact between sliding surfaces in circumstances of such a kind necessitates the provision of a lubricating film between the sealing element and the cylinder wall. This lubricating film is responsible for leakage loss. Moreover, the co-operating sealing faces which are subjected to the pressure of the gaseous or hydraulic medium naturally give rise to considerable friction which resists easy sliding displacement of the piston inside its cylinder.

Many of the drawbacks of these known types of seal can be overcome by using a sealing element with one or more sealing lips. In such seals only the lips make contact with the cylinder wall and frictional loss is therefore reduced. The forces required for overcoming the rubbing resistance between the piston and the cylinder wall are fairly low. Moreover, the squeegee effect of the sealing lip on the cylinder wall substantially eliminates leakage loss. However, since the sealing lips in such seals are usually not or only very slightly yieldably flexible they must be very precisely fitted into the cylinder to ensure the efficiency of the seal and also to prevent undue wear by abrasion. Owing to their low deformability, lipped seals cannot readily adapt themselves even to slight irregularities on the inside surface of a hydraulic or like cylinder. The inside surface of the cylinder must therefore also be of unexceptionable quality. If the pressures are high, in the order of several hundred atmospheres, as is often the case for instances in hydraulic pit props and so forth, lipped seals have not been adopted because they too easily tear at these pressures and are thus destroyed.

In order to overcome these drawbacks, it has already been proposed to provide a piston intended to work in a high pressure cylinder with a jacket of elastically deformable material and integrally with this jacket to form a sealing lip which is then likewise elastically yielding. The dimensions and shape of the sealing lip are so chosen that the sealing lip will bear with some contact pressure against the inside wall of the cylinder when the piston is inserted into the same, said contact pressure being then further increased by the pressure of the working fluid.

However, one disadvantage of this proposed sealing lip is that it requires to be rather carefully and accurately fitted and that it makes somewhat stringent demands upon the surface quality of the cylinder since even minor irregularities already lead to premature wear and inadmissibly high leakage loss. Moreover, the natural contact pressure of the lip against the cylinder wall cannot be controlled in actual practice and with increasing wear it becomes less until the seal is finally insufficiently tight even with the help of the pressure of the working medium inside the cylinder. This is a major objection in hydraulic pit props in which any unexpected leakage at the seal may cause a pressure relief of the prop and lead to a fall of roof, with the consequent risk of grave accidents and lengthy stoppages in a mine. Moreover, the fact that the contact pressure of the sealing lip against the cooperating surface may slowly relax is also an extremely undesirable feature in all kinds of reciprocating piston machines, such as displacement type compressors and pumps, and in such engines the seals therefore require renewal after relatively short periods of use. In the type of seal at present under consideration replacement is particularly awkward as well as expensive because, apart from the sealing lip, the entire jacket which is adhesively affixed or vulcanized on to the piston core consisting of inflexible material must be stripped and renewed. The replacement of this jacket in practice involves its destruction and this naturally means considerable cost.

The invention is a further development of the last described known type of sealing means with a lip, and eliminates the described disadvantages of such a seal.

According to the invention, a piston for hydraulic and like cylinders, particularly a ram piston for a hydraulic pit prop, consisting, at least on its periphery, of an elastically deformable material, comprises at least one elastic sealing lip integrally formed on said elastically deformable part of the piston and cooperating with the inside wall of the cylinder, and a straining ring adjustably attached to the piston on the pressure side thereof for applying an elastically deforming thrust to the sealing lip to urge the same tightly against the inside wall of the cylinder.

Preferably, the straining ring is threadedly attached to the piston.

The adjustable screw-down straining ring permits the sealing lip to be thrust against the inside wall of the cylinder with very considerable force. Naturally this must be selected in such a way that the friction between the lip and the cylinder wall and the wear on the lip are not excessive. The contact pressure may be varied according to existing conditions and it is possible, more particularly, to take up any wear experienced by the sealing lip in course of use by re-tightening the straining ring. A seal contrived as proposed by the present invention can therefore be made to last very much longer than known seals of this kind, because even considerable wear of the sealing lip or lips can be readily compensated by tightening the straining ring, and this does away with the necessity of replacing the lip together with the flexible piston jacket at frequent intervals.

Moreover, the provision of the straining ring also permits any design and manufacturing tolerations within given limits to be absorbed so that the stringent requirements as to precision in the production of the cylinder as well as the piston and piston seal can be relaxed, and subsequent manual fitting at the same time avoided. Furthermore, the sealing lip according to the invention which bears against the cylinder wall with a relatively high pressure is capable to some extent of resiliently adapting itself to any irregularities in the cylinder wall without impairing the reliability of the seal and without increasing the wear. This is a matter of major importance in hydraulic pit props in which the ram cylinders are necessarily manufactured to fairly wide tolerances for reasons of cheapness and in which the cylinder walls are liable to suffer some permanent deformation by the rough treatment they will experience in underground workings. Known types of sealing lip are unable to compensate such tolerational and deformational differences and they have therefore not yet been adopted as sealing means in hydraulic pit props.

Conveniently a projecting circular extension is formed on the side of the straining ring facing the sealing lip and bears against the inside of the sealing lip. The entire periphery of the lip can thus be evenly pressed against the inside cylinder wall with a simultaneous fairly considerable amount of elastic deformation of the lip. Preferably the circular extension may be of substantially wedge-shaped, triangular or trapezoidal cross-section. A straining ring of the proposed kind permits the pressure of the sealing lip against the inside cylinder wall to be varied within very wide limits so that the same seal can be used for widely different working pressures of the hydraulic medium. No difficulty arises in providing sealing lips of relatively strong cross-section, the lips being formed by undercutting an appropriate annular recess into the peripheral piston surface. Sealing lips thus contrived can still be urged with adequate force against the inside cylinder wall.

In a preferred embodiment of the invention an outer side face of the circular extension cooperates with the sealing lip and is approximately parallel with the peripheral piston surface, whereas an inner peripheral face of the extension slopes at an acute angle to the peripheral piston surface. When the straining ring is tightened the described shape of the extension provides a mechanical advantage which permits the sealing lip to be urged against the cylinder wall with a very considerable component of radial thrust.

An advantage can also be gained if at least the circular extension of the straining ring is likewise made of an elastically deformable material. Primarily this ensures that the sealing lip will not be damaged or notched when the straining ring is tightened. However, in a particularly useful form of construction, the circular extension of the straining ring and the cooperating sealing lip are so disposed and contrived that both are elastically deformed in opposite directions when the ring is tightened. The sealing lip and the circular extension thus resiliently cooperate and a seal formed in this way is particularly adaptable to inaccuracies and irregularities of the cylinder wall.

In some instances it is advisable that the entire straining ring should consist of an elastically deformable material, particularly a rubber-like synthetic plastic material of high resistance to abrasion, high compressive and shear strength, low swellability and high resistance to chemical attack by acids and caustics. Such a straining ring which consists completely of synthetic plastic material can be particularly easily and cheaply produced, for instance by injection moulding, and at the same time it weighs less than a metal ring.

Generally it may be preferred that the piston should likewise consist of an elastically deformable material throughout its cross-section. Owing to the longer life of the proposed seal in relation to known seals, the integral construction of lip and piston is economically quite acceptable. Pistons which consist of a deformable synthetic plastic material throughout can be easily produced for instance by injection moulding, and the peripheral lip can then be formed on the piston during this process of manufacture, no subsequent hand work being required. The lips may be formed by annular, groove-like recesses of roughly wedge-shaped or triangular cross-section undercut into the outer peripheral piston surface. The cost of producing plastic pistons thus provided with peripheral sealing lips is only a fraction of that of making pistons of conventional kind, many of which consist of metal and which are usually composed of several parts generally requiring at least some, often complicated, machining. Moreover, the production of the whole of the piston in the form of a single elastically deformable, for instance plastic, part has the further advantage of providing a saving in weight. This is a factor of importance when such pistons are intended for use in hydraulic pit props. However, even in piston-type engines, a reduction in weight often means a welcome reduction in the dynamic forces and may also have a vibration suppressing effect. Finally the construction of the entire piston in the form of an integral elastically deformable part has the further advantage that the pressure applied to the piston by the working medium axially compresses the piston and thereby tends to expand the piston in the radial direction, pressing it into contact with the cylinder wall and thus assisting in producing the sealing effect by the lips.

According to yet another feature of the invention the straining ring may be provided on the inside of the circular extension, i.e. on the piston centre side of the extension, with ducts, holes or the like, through which the pressure of the hydraulic or like fluid can be transmitted to the inner peripheral face of the extension and applied to the sealing lip. The pressure of the working medium is thus utilized to assist the straining ring in pressing the sealing lip into contact with the inside cylinder wall.

Figure 2:
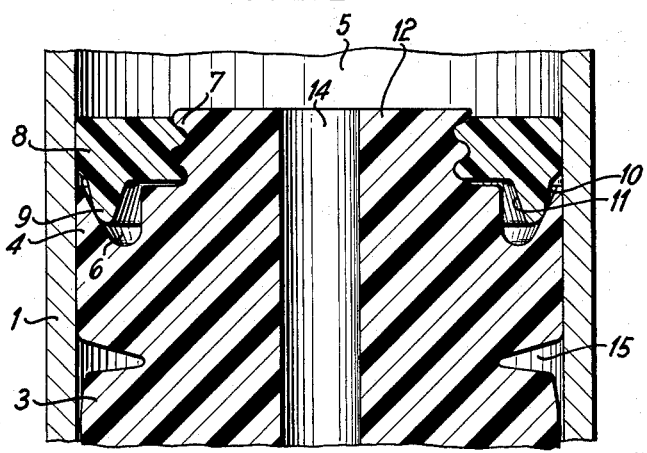
Figure 3:
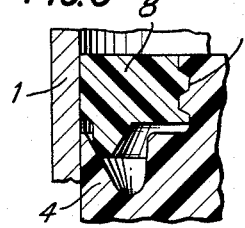
Figure 4:
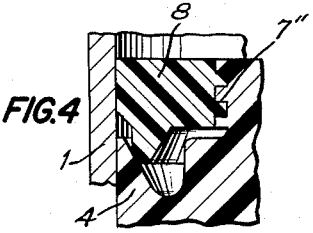

Two preferred embodiments of the invention will now be described by way of example and with reference to the accompanying drawing, in which:

FIG. 1 is a fragmentary sectional view of a hydraulic pit prop equipped with a ram piston contrived according to the present invention, FIG. 2 is a view similar to FIG. 1, but showing an alternative form of construction of the ram piston; and FIGS. 3 and 4 are fragmentary sectional views of arrangements similar to FIG. 1 and showing further modifications.

FIGS. 1 and 2 exemplify the invention by showing the ram piston of a hydraulic pit prop. 1 is the outer member and 2 the inner member of the prop. The inner end of the inner prop member 2 carries a ram piston 3 which is longitudinally slidably guided in fluid-tight manner inside the outer prop member 1.

As will be understood by reference to FIG. 1, the ram piston 3 which throughout its cross-section consists of an elastically deformable synthetic plastic material of low swelling properties but high resistance to abrasive wear as well as to acid and caustic attack, such as one of the plastics commercially sold under the trade names "Phoenolan" or "Vulkollan," is provided with a sealing lip 4 near the piston end remote from the inner end of the inner prop member 2, said sealing lip being of integral construction with the rest of the piston. The sealing lip 4 is formed by an annular, groove-like recess 6 of approximately triangular cross-section which opens towards the pressure chamber 5 in the outer prop member 1, and which is cut into the head of the piston 3.

FIG. 1 also shows that the end of the piston 3 facing the pressure chamber 5 carries a straining ring 8 which is detachably affixed thereto, for instance by means of screw threads 7. The straining ring 8 presses the sealing lip 4 elastically into tight contact with the inside wall of the outer prop member 1. The screw threads 7 are shown in FIGS. 1 and 2 as of semicircular cross-section, whereas FIG. 3 shows threads 7' of trapezoid cross-section and FIG. 4 threads 7" of rectangular cross-section.

The screw-down straining ring 8 is formed on the side facing the sealing lip 4 with a projecting ridge-like circular extension 9 which in cross-section forms a wedge. The outer side face 10 of the circular extension 9 which cooperates with the sealing lip 4 is approximately parallel with the peripheral surface of the piston 3, whereas the inner peripheral face 11 of the extension 9 forms an acute angle therewith.

FIG. 1 clearly shows that the circular extension 9 of the straining ring 8 bears against the inside of the sealing lip 4 from within the recess 6 and urges the same into fluid-tight contact with the internal wall of the outer prop member 1 when the straining ring 8 is screwed down in the threads 7 into the crown over the head 12 of the piston 3. In the embodiment according to FIG. 1 the straining ring 8 likewise consists of an elastically deformable material, such as the above-mentioned "Phoenolan" or "Vulkollan," so that upon being tightened or re-tightened the circular extension 9 of the ring 8 and the co-operating sealing lip 4 will be elastically deflected in opposite directions.

Moreover, the screw-down ring 8 is provided with a plurality of holes or bores 13 on the inside, i.e. the piston centre side, of the circular extension 9. The pressure existing in the chamber 5 can therefore affect the sealing lip 4 from the inside and press it into contact with the inside wall of the outer prop member 1, thereby supplementing the outward thrust generated by the straining ring 8.

In the embodiment according to FIG. 1 which relates to a hydraulic pit prop the ram piston 3 has an axial bore 14 which provides communication between the pressure chamber 5 in the outer prop member 1 and the pressure chamber 5a in the inner prop member 2. The hydraulic medium can therefore relieve both the outer and the inner prop member of the longitudinal load, so the prop members are therefore substantially subjected to a bursting load only.

Moreover, roughly midway up its side the plastic ram piston 3 is formed with a peripheral groove-like recess 15 of approximately triangular cross-section which in the axial direction defines a division between two piston parts. Since the piston consists of an elastically deformable synthetic plastic material the two parts of the piston are thus provided with limited freedom to cant in relation to one another. The portion of the piston 3 nearest the inner prop member 2 may be connected with the inner prop member 2 either adhesively or by means of a screw joint with the possible interposition of sealing devices and metal bushes.

The second embodiment shown in FIG. 2 differs from that illustrated in FIG. 1 in that holes 13 are not provided in the straining ring 8 so that the sealing lip 4 is pressed against the inner wall of the outer prop member 1 exclusively by the thrust generated by the straining ring 8 when this is screwed down over the head 12 of the piston.

In a further modification of the embodiments according to FIGS. 1 and 2 the ram piston may be formed with a plurality of axially consecutive sealing lips. Moreover, the provision in the straining ring 8 of the holes or bores 13 for the pressure medium may be dispensed with—as shown in the form of construction according to FIG. 2—and the straining ring provided with design tolerations which are sufficient to permit the hydraulic pressure to be transmitted to the sealing lip 4 through the gap between the inside wall of the ram cylinder, i.e. the inside wall of the outer prop member 1, and the outer peripheral surface of the straining ring 8, and thereby to apply additional pressure to the sealing lip assisting the thrust of the straining ring 8 urging the lip against the inside wall of the outer prop member. Furthermore, only the ring-shaped extension 9 of the straining ring 8 may consist of an elastically deformable material and the rest of the straining ring 8 may be of hard inflexible material, such as a metal, the extension 9 being attached to the ring proper for instance by vulcanisation, an adhesive, or some alternative connecting means.

Although it is preferred that the ram piston 3 should consist of an elastically deformable material and particularly of a synthetic plastic material throughout the whole of its cross-section, it is naturally possible, if desired, to confine the use of such a material to the peripheral parts of the ram piston 3. In such a case the sealing lip or lips is or are made of one piece with the elastic material which forms a jacket around a ram piston core consisting of a hard inflexible material, bonding being effected for instance by vulcanisation, by an adhesive, and so forth.

I claim:
1. A piston for hydraulic or like cylinders comprising, in combination, a piston body having at least a peripheral portion formed from elastically deformable material; a sealing lip integrally formed with said elastically deformable portion of said piston and having an outer annular surface adapted to engage the inner surface of the cylinder and an inner annular surface facing away from the inner surface of the cylinder; and a straining ring threadedly attached to said piston body on the pressure side thereof adjustably in direction of the piston axis and being formed with an annular projection means having an outer annular surface engaging said inner annular surface of said sealing lip for elastically deforming said lip in radially outward direction so as to press the outer surface thereof tightly against the inner surface of said cylinder.

2. A piston for hydraulic or like cylinders comprising, in combination, a piston body having at least a peripheral portion formed from elastically deformable material; a sealing lip integrally formed with said elastically deformable portion of said piston and having an outer annular surface adapted to engage the inner surface of the cylinder and an inner annular surface facing away from the inner surface of the cylinder; and a straining ring attached to said piston body on the pressure side thereof adjustably in direction of the piston axis and being formed with an annular projection means projecting in axial direction from the remainder of said straining ring and having an outer annular surface engaging said inner annular surface of said sealing lip for elastically deforming said lip in radially outward direction so as to press the outer surface thereof tightly against the inner surface of said cylinder.

3. A piston as claimed in claim 2, wherein said annular projection means of the straining ring has an axial cross-section of substantially wedge-shaped configuration.

4. A piston as claimed in claim 2, wherein said annular projection means of the straining ring has an axial cross-section of substantially triangular configuration.

5. A piston as claimed in claim 2, wherein said annular projection means of the straining ring has an axial cross-section of substantially trapezoidal configuration.

6. A piston as claimed in claim 2, wherein an outer side face of said annular projection means cooperates with the sealing lip and is approximately parallel with the peripheral piston surface, whereas an inner peripheral face of the projection means slopes at an acute angle of the peripheral piston surface.

7. A piston for hydraulic or like cylinders comprising, in combination, a piston body having at least a peripheral portion formed from elastically deformable material; a sealing lip integrally formed with said elastically deformable portion of said piston body and having an outer annular surface adapted to engage the inner surface of the cylinder and an inner annular surface facing away from the inner surface of the cylinder; a straining ring on the pressure side of said piston body arranged adjustable in direction of the piston axis and being formed with an annular projection means having an outer annular surface engaging said inner annular surface of said sealing lip for elastically deforming said lip in radially outward direction so as to press the outer surface thereof tightly against the inner surface of the cylinder; and cooperating means on said piston body and said straining ring for maintaining the latter in a fixed adjusted position relative to said piston body.

8. A piston as claimed in claim 7 wherein said piston body is formed in said peripheral portion with an annular, groove-like recess of substantially wedge-shaped cross-section.

9. A piston as claimed in claim 7 wherein said piston body is formed in said peripheral portion with an annular, groove-like recess of substantially triangular-shaped cross-section.

10. A piston as claimed in claim 7, wherein the straining ring consists entirely of an elastically deformable material of high resistance to abrasion, satisfactory compressive and shearing strength, low swellability and high resistance to attack by acids and caustics.

11. A piston as claimed in claim 10, wherein the elastically deformable material comprises a rubber-like synthetic plastic material.

12. A piston as claimed in claim 7, wherein the piston consists throughout its cross-section of an elastically deformable material and an annular, groove-like recess is undercut into the outer peripheral surface of the piston and forms the sealing lip.

13. A piston as claimed in claim 12, wherein the annular groove-like recess is of substantially wedge-shaped cross-section.

14. A piston as claimed in claim 12, wherein the annular groove-like recess is of substantially triangular cross-section.

15. A piston for hydraulic or like cylinders comprising, in combination, a piston body having at least a peripheral portion formed from elastically deformable material; a sealing lip integrally formed with said elastically deformable portion of said piston body and having an outer annular surface adapted to engage the inner surface of the cylinder and an inner annular surface facing away from the inner surface of the cylinder; a straining ring on the pressure side of said piston body arranged adjustable in direction of the piston axis, said straining ring having an inner radius at least as large as the distance of the innermost part of said peripheral portion of said piston body from the axis of said piston and being formed with an annular projection means having an outer annular surface engaging said inner annular surface of said sealing lip for elastically deforming said lip in radially outward direction so as to press the outer surface thereof tightly against the inner surface of the cylinder; and cooperating means on said piston body and said straining ring for maintaining the latter in a fixed adjusted position relative to said piston body.

16. A piston for hydraulic or like cylinders comprising, in combination, a piston body having at least a peripheral portion formed from elastically deformable material; a sealing lip integrally formed with said elastically deformable portion of said piston body and having an outer annular surface adapted to engage the inner surface of the cylinder and an inner annular surface facing away from the inner surface of the cylinder; a straining ring of elastically deformable material on the pressure side of said piston body arranged adjustable in direction of the piston axis and being formed with an annular projection means having an outer annular surface engaging said inner annular surface of said sealing lip for elastically deforming said lip in radially outward direction so as to press the outer surface thereof tightly against the inner surface of the cylinder; and cooperating means on said piston body and said straining ring for maintaining the latter in a fixed adjusted position relative to said piston body.

17. A piston as claimed in claim 16, wherein said annular projection means of the straining ring and the cooperating sealing lip are so disposed and contrived that both are elastically deformed in opposite directions when the ring is tightened.

18. A piston as claimed in claim 6, wherein holes or bores are provided in the straining ring on the inside, piston centre side of said annular projection means, through which holes or bores the pressure of the hydraulic fluid can be transmitted to the inner peripheral face of the projection and to the sealing lip.

19. A piston as claimed in claim 1, wherein a central, externally threaded head is formed on the side of the piston facing the pressurised chamber and an internal thread is provided in the straining ring for engagement on the external thread on the central head.

20. A piston as claimed in claim 19, wherein the external thread on the central piston head and the cooperating internal thread of the straining ring have a trapezoidal cross-section.

21. A piston as claimed in claim 19, wherein the external thread on the central piston head and the cooperating internal thread of the straining ring have a circular cross-section.

22. A piston as claimed in claim 19, wherein the external thread on the central piston head and the cooperating internal thread of the straining ring have a rectangular cross-section.

23. A piston as claimed in claim 12, wherein the piston is of integral construction and the elastically deformable material comprises a synthetic plastic material of low swellability, high resistance to abrasive wear as well as to acid and caustic attack.

References Cited in the file of this patent

UNITED STATES PATENTS

| | | |
|---|---|---|
| 289,776 | Luton | Dec. 4, 1883 |
| 1,604,287 | Kibele | Oct. 26, 1926 |
| 1,773,363 | Kibele | Aug. 19, 1930 |
| 1,828,056 | Lamb | Oct. 20, 1931 |
| 2,672,383 | Hamer | Mar. 16, 1954 |
| 2,977,167 | Barnhart | Mar. 28, 1961 |
| 3,040,712 | Harrah | June 26, 1962 |